(12) United States Patent
Qian

(10) Patent No.: US 11,851,859 B1
(45) Date of Patent: Dec. 26, 2023

(54) VALVE ELEMENT COVER PLATE AND SHOWER FAUCET MADE THEREOF

(71) Applicant: Wenzhou Yisheng Sanitary Ware Co., Ltd., Wenzhou (CN)

(72) Inventor: Shizhu Qian, Wenzhou (CN)

(*) Notice: Subject to any disclaimer, the term of this patent is extended or adjusted under 35 U.S.C. 154(b) by 0 days.

(21) Appl. No.: 17/837,629

(22) Filed: Jun. 10, 2022

(30) Foreign Application Priority Data

May 24, 2022 (CN) .......................... 202221265593.0

(51) Int. Cl.
| | |
|---|---|
| *E03C 1/04* | (2006.01) |
| *F16K 11/00* | (2006.01) |
| *H02K 7/18* | (2006.01) |
| *E03C 1/02* | (2006.01) |

(52) U.S. Cl.
CPC .......... *E03C 1/0408* (2013.01); *F16K 19/006* (2013.01); *E03C 2001/026* (2013.01); *E03C 2001/0418* (2013.01); *E03C 2201/40* (2013.01); *H02K 7/1823* (2013.01)

(58) Field of Classification Search
CPC ........ E03C 1/023; E03C 1/0408; E03C 1/042; E03C 2001/0418
See application file for complete search history.

(56) References Cited

U.S. PATENT DOCUMENTS

| | | | | |
|---|---|---|---|---|
| 2009/0320203 | A1* | 12/2009 | Chen | E03C 1/0408 239/443 |
| 2010/0224266 | A1* | 9/2010 | Lorch | E03C 1/023 137/15.04 |
| 2015/0308086 | A1* | 10/2015 | Feng | E03C 1/042 4/678 |
| 2018/0340624 | A1* | 11/2018 | Wang | F16K 31/041 |
| 2018/0340843 | A1* | 11/2018 | Tsai | E03C 1/04 |
| 2019/0194915 | A1* | 6/2019 | Tsuruda | E03C 1/055 |
| 2019/0316332 | A1* | 10/2019 | Biju-Duval | E03C 1/0408 |
| 2020/0263398 | A1* | 8/2020 | Hobbs | E03C 1/04 |

FOREIGN PATENT DOCUMENTS

EP 3015610 A1 * 5/2016 ........... E03C 1/0408

* cited by examiner

*Primary Examiner* — Reinaldo Sanchez-Medina
(74) *Attorney, Agent, or Firm* — Sandy Lipkin

(57) ABSTRACT

The present invention provides a valve element cover plate, comprising a cover plate body. The cover plate body is provided with a water mixing valve mounting position and at least one switching valve mounting position. A cold water inlet, a hot water inlet and water outlets connected to water mixing valve mounting position are arranged on the back of the cover plate body; a water diverting channel is arranged in the cover plate body. A mixed water channel is arranged in the water mixing valve mounting position; fixing parts are arranged on the side of the cover plate body. The present invention has good sealing effect, and can maintain good sealing performance even when the cover plate body is deformed. It also has good filtering effect, and can effectively reduce the wear of downstream switching valve elements, and avoid blockage at the downstream outlets.

8 Claims, 6 Drawing Sheets

VALVE ELEMENT COVER PLATE AND SHOWER FAUCET MADE THEREOF

REFERENCE TO PRIOR APPLICATION

This application claims priority to Chinese Patent Application 202221265593.0, filed on May 24, 2022, which is incorporated herein by reference.

FIELD OF THE INVENTION

The present invention relates to the field of shower faucets, in particular to a valve element cover plate and shower faucet made thereof.

BACKGROUND OF THE INVENTION

Shower faucets are widely used in bathrooms. A concealed shower faucet is entirely installed in the wall, so a detachable cover plate is separately arranged for the sake of easy installation, and valve elements as well as other components are installed together on the cover plate body. It mainly comprises a cover plate body for installing valve elements and setting water channels between the valve elements, and a water distribution box embedded in the wall. When fixing, directly press the cover plate body to the bottom of the inner cavity of the concealed water distribution box, and install a sealing ring between the contact surfaces of the two components to achieve sealing effect. However, the cover plate body is prone to deformation under the action of water pressure, and slight deformation would weaken the sealing effect between the two, resulting in water leakage.

SUMMARY OF THE INVENTION

In order to solve the above problems, the present invention provides a valve element cover plate and shower faucet made thereof which has good sealing effect, and can maintain good sealing performance even when the cover plate body is deformed, and also has good filtering effect, easy to maintain, and can effectively reduce the wear of downstream switching valve elements, improve the service life of the valve elements and avoid blockage at the water outlets.

To solve the above problems, the present invention adopts the following technical scheme: a valve element cover plate, comprising a cover plate body. The cover plate body is provided with a water mixing valve mounting position and at least one switching valve mounting position. A cold water inlet and a hot water inlet connected to the water mixing valve mounting position, and water outlets corresponding to the switching valve mounting positions are arranged on the back of the cover plate body. The cold water inlet, the hot water inlet and the water outlets protrude outwards away from the front side of the cover plate body. The cold water inlet, the hot water inlet and the outer cylindrical wall of the water outlets are provided with sealing rings; a water diverting channel connected in series with each switching valve mounting position is arranged in the cover plate body. A mixed water channel connected to the water diverting channel is arranged in the water mixing valve mounting position; fixing parts are arranged on the side of the cover plate body.

The above structure shows that the sealing is achieved by changing traditional end-face sealing structure into protruding structure, that is, allow the cold water inlet, the hot water inlet and the water outlets to protrude outwards, and then arrange sealing rings on their outer cylindrical walls. When finally connecting to the concealed water distribution box, insert them into the corresponding connectors of the concealed water distribution box to improve the sealing effect. Even when the cover plate body is deformed, a sufficient axial allowance from connecting and inserting can ensure the sealing effect, so it can still maintain a good sealing performance in a high-pressure water environment; the cold water inlet and the hot water inlet are used to supply cold water and hot water respectively. After being mixed by the water mixing valve element in the water mixing valve mounting position, the water is discharged through the mixed water channel to the downstream. When the water enters the diverting channel, the switching valve elements in each switching valve mounting position control the on-off of their respective water outlets; fixing parts are arranged on the side of the cover plate body for connecting the concealed water distribution box during installation.

Further, the present invention proposes that the cover plate body is provided with a filter mounting position, and the mixed water channel is connected to the water diverting channel through the filter mounting position.

The above structure shows that the mixed water is filtered by the filter and debris such as scale will not enter the switching valve elements to avoid wear and blockage at the downstream water outlets; since the filter is installed at the downstream of the water mixing valve element, and the user only needs to close the water mixing valve element when replacing or cleaning the filter without turning off the indoor water main, which effectively improves the convenience of cleaning or replacing the filter.

Further, the present invention proposes that a mixed water outlet connected to the filter mounting position and a mixed water inlet connected to the upstream of the water diverting channel are arranged on the back of the cover plate body; the filter mounting position is connected to the mixed water inlet through the mixed water outlet and the external pipeline and then connected to the water diverting channel; the mixed water outlet and the mixed water inlet protrude outwards away from the front side of the cover plate body; sealing rings are arranged in the mixed water outlet and on the outer cylindrical wall of the mixed water inlet.

The above structure shows that the mixed water channel is connected to the inner cylindrical wall of the filter mounting position, and the mixed water outlet is connected to the bottom of the filter mounting position. The filter is a cylindrical filter screen (where the mixed water is filtered after flowing through the mixed water channel, from the outer cylindrical wall of the filter towards the center of the filter, then discharged from the mixed water outlet) and the mixed water outlet is connected to the mixed water inlet through the external pipeline; the above structure is designed for easily demolding the cover plate body when it is produced by injection molding, and arranging the filter; the mixed water outlet and the mixed water inlet also protrude outwards to ensure the sealing effect.

Further, the present invention proposes that the cover plate body is provided with a hydroelectric generator mounting position, and the mixed water inlet is connected to the water diverting channel through the hydroelectric generator mounting position.

The above structure shows that the mixed water enters the hydroelectric generator mounting position through the mixed water inlet and then flows to the water diverting channel.

Further, the present invention proposes that a hydroelectric generator is arranged in the hydroelectric generator mounting position.

The above structure shows that the water flows from the rear end face of the hydroelectric generator to the side wall of its middle section during operation, so the mixed water inlet is arranged at the bottom of the hydroelectric generator mounting position to enable the water to effectively wash the impellers of the hydroelectric generator and flow to the downstream through the water diverting channel connected to the inner cylindrical wall of the hydroelectric generator mounting position.

Further, the present invention proposes that a display module is arranged outside the hydroelectric generator in the hydroelectric generator mounting position.

The above structure shows that the display module is electrically connected to the hydroelectric generator for displaying information such as water temperature and flow rate, and the hydroelectric generator is provided with a temperature sensor.

Further, the present invention proposes that the water mixing valve mounting position, the switching valve mounting positions, the filter mounting position and the hydroelectric generator mounting position are arranged on the front side of the cover plate body.

The arrangement can effectively ensure the compactness of the overall structure; the water mixing valve mounting position, the switching valve mounting positions, the filter mounting position and the hydroelectric generator mounting position are preferably arranged on the front side of the cover plate body, and can also be arranged on the upper surface of the cover plate body.

Further, the present invention proposes that a water mixing valve element is arranged in the water mixing valve mounting position; switching valve elements are arranged in the switching valve mounting positions; and a filter is arranged in the filter mounting position.

The above structure shows that the water mixing valve element is used to adjust the mixing ratio of cold water to hot water, and control the on/off of the overall water flow; the switching valve elements are used to control the on/off of the water flow at their respective downstream outlets; the filter and the filter mounting position are detachable and preferably connected by threads.

Further, the present invention proposes that at least one outer groove is arranged at the cold water inlet, the hot water inlet, the water outlet, the mixed water outlet and the outer cylindrical wall of the mixed water inlet, and the sealing ring is arranged in the outer groove.

The above structure shows that two outer grooves are preferably arranged for further improving the sealing effect.

A shower faucet made of the valve element cover plate, further comprising a concealed water distribution box. The concealed water distribution box is provided with a cold water connector, a hot water connector, and outlet connectors arranged in the same number as that of the water outlets. One end of the cold water connector, the hot water connector and the outlet connectors arranged in the same number as that of the water outlets are respectively arranged at the outer wall of the concealed water distribution box, and the other end thereof is respectively arranged at the bottom of the inner cavity of the concealed water distribution box; connecting parts corresponding to the fixing parts are arranged at the bottom of the inner cavity of the concealed water distribution box. A plurality of the fixing parts and a plurality of the connecting parts are arranged correspondingly to each other in the same number. The fixing parts are connected by screws to the connecting parts. Therefore, the cold water inlet, the hot water inlet and each water outlet on the back of the cover plate body are respectively connected to the cold water connector, the hot water connector and each outlet connector to achieve sealing effect.

The above structure shows that the concealed water distribution box is buried in the wall, its cold water connector is connected to the water main, its hot water connector is connected to the water heater, and its outlet connectors are connected to each water outlet; the cover plate body is fixed in the concealed water distribution box by screws, and each connector is connected and inserted for good sealing. Compared with simple end-face squeezing seal, it has higher sealing performance and stronger pressure-bearing capacity, thus forms a concealed shower faucet with filtering function.

Further, the present invention proposes that the external pipeline is arranged at the bottom of the inner cavity of the concealed water distribution box and provided with two mixed water connectors connected to each other. The mixed water outlet and the mixed water inlet are inserted into the mixed water connectors to achieve sealing.

The above structure shows that the external pipeline is used to connect the mixed water outlet with the mixed water inlet.

The present invention has the following beneficial effects: traditional end-face sealing structure is changed into the protruding structure, that is, allow the cold water inlet, the hot water inlet and the water outlets to protrude outwards, and then arrange sealing rings on their outer cylindrical walls. When finally connecting to the concealed water distribution box, insert them into the corresponding connectors of the concealed water distribution box to improve the sealing effect. Even when the cover plate body is deformed, a sufficient axial allowance from connecting and inserting can ensure the sealing effect, so it can still maintain a good sealing performance in a high-pressure water environment; the cold water inlet and the hot water inlet are used to supply cold water and hot water respectively. After being mixed by the water mixing valve element in the water mixing valve mounting position, the water is discharged through the mixed water channel to the downstream. When the water enters the diverting channel, the switching valve elements in each switching valve mounting position control the on-off of their respective water outlets; fixing parts are arranged on the side of the cover plate body for connecting the concealed water distribution box during installation.

Figure 1:
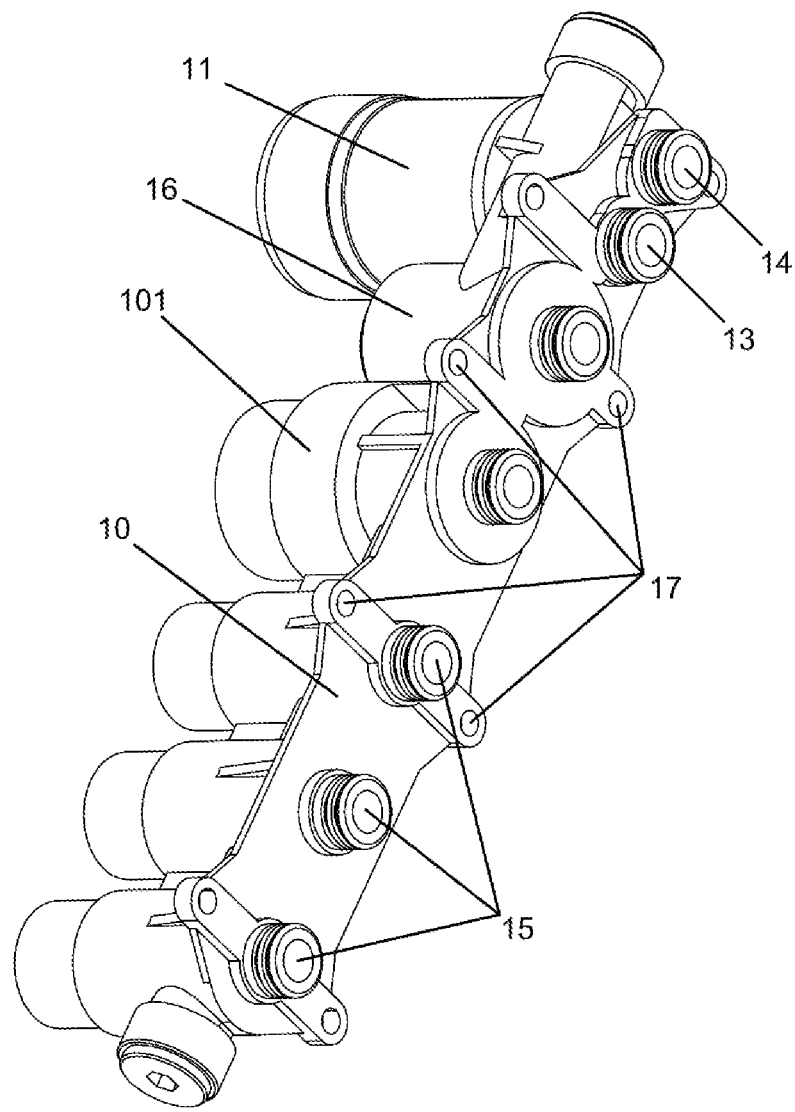
FIG. 1 is a three-dimensional structural diagram of the valve element cover plate of the present invention.

Description of the Reference Numerals: 10—Cover plate body; 101—Hydroelectric generator mounting position; 102—Hydroelectric generator; 103—Display module; 11—Water mixing valve mounting position; 111—Mixed water channel; 112—Water mixing valve; 12—Switching valve mounting position; 121—Water diverting channel;

122—Switching valve; 13—Cold water inlet; 14—Hot water inlet; 15—Water outlet; 16—Filter mounting position; 161—Filter; 17—Fixing part; 18—Mixed water outlet; 19—Mixed water inlet; 20—Concealed water distribution box; 21—External pipeline; 211—Mixed water connector; 22—Cold water connector; 23—Hot water connector; 24—Outlet connector; 25—Connecting part; 30—Outer groove.

DETAILED DESCRIPTION OF PREFERRED EMBODIMENTS

The implementation of the present invention will be described in further detail below with reference to the accompanying drawings and embodiments. The following embodiments are used to illustrate the present invention, but are not intended to limit the scope of the present invention.

Embodiment 1

Figure 2:
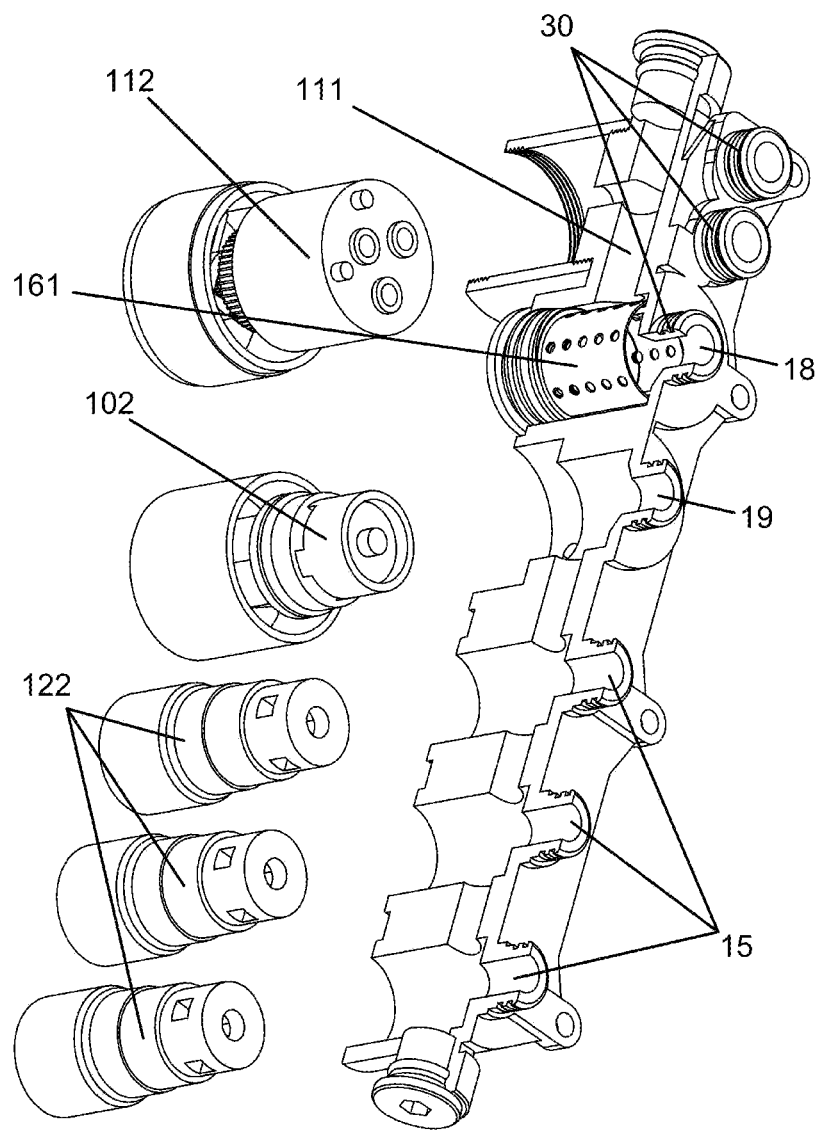
FIG. 2 is an explosive partial sectional view of the valve element cover plate of the present invention.
Figure 3:
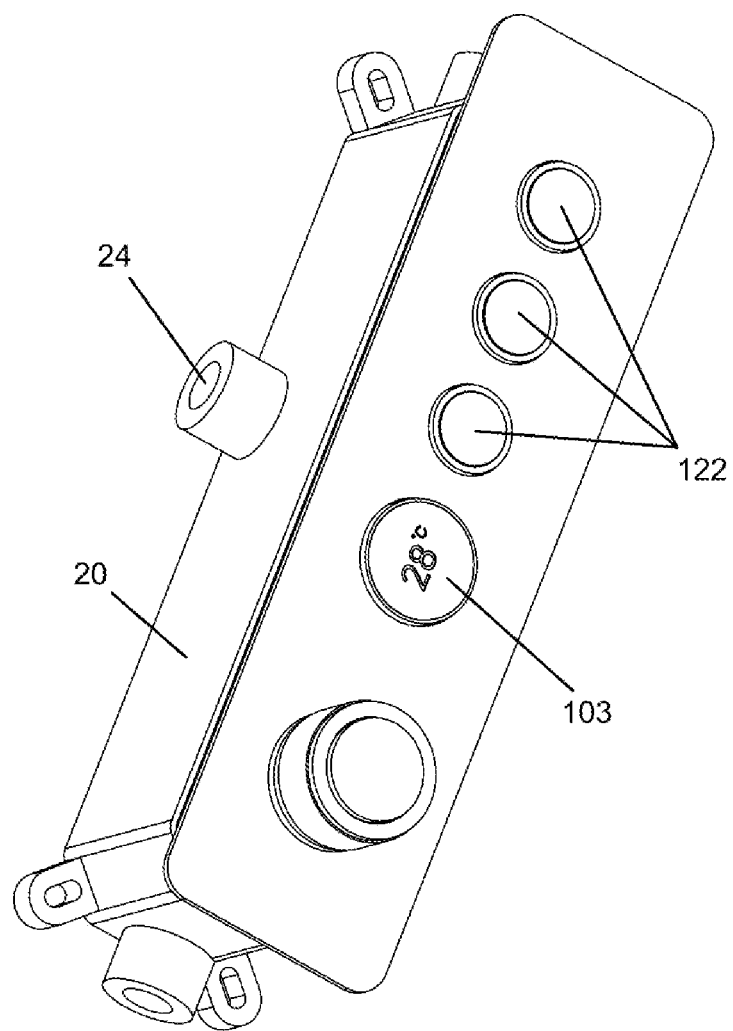
FIG. 3 is a front view of the overall structure of the shower faucet of the present invention.
Figure 4:
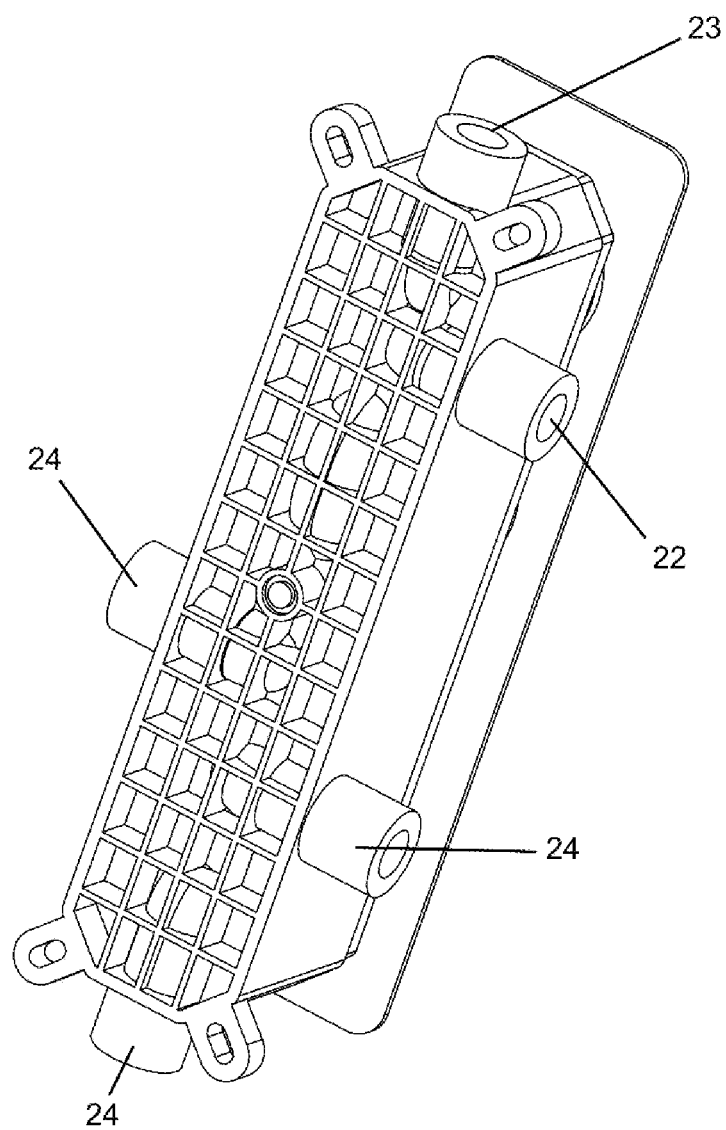
FIG. 4 is a rear view of the overall structure of the shower faucet of the present invention.
Figure 5:
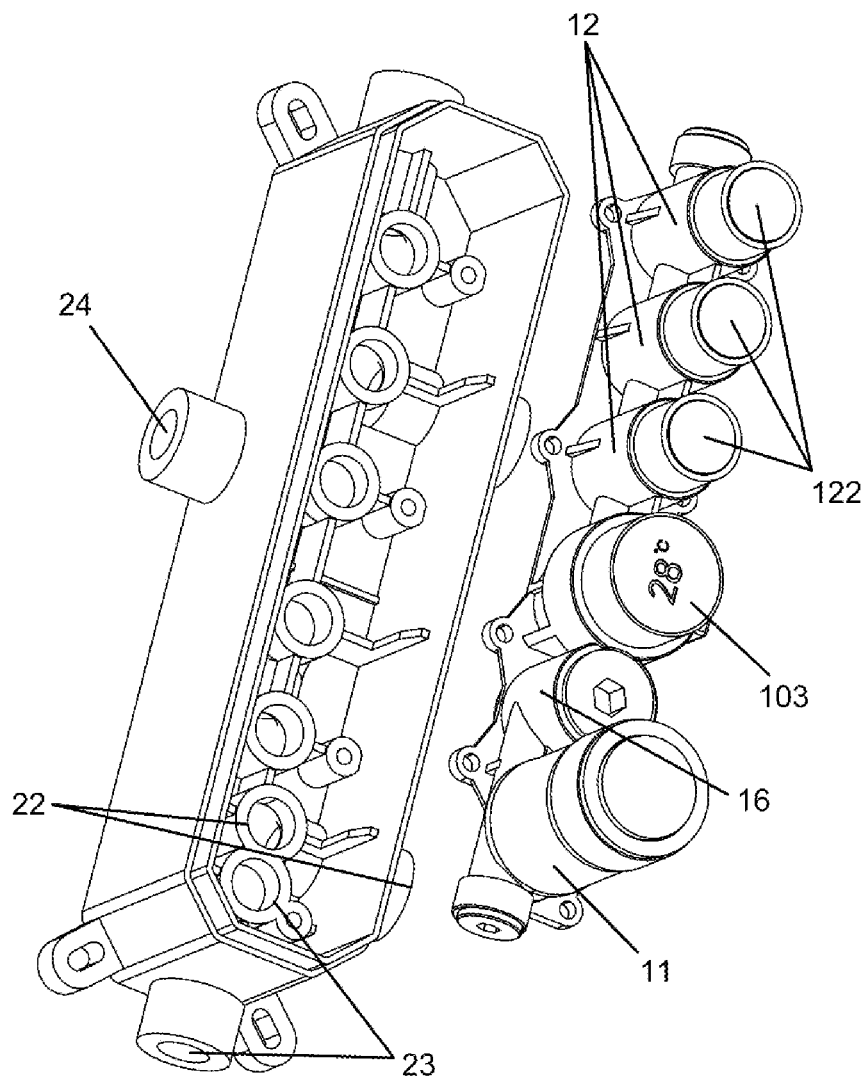
FIG. 5 is an explosive structural diagram of the shower faucet of the present invention.
Figure 6:
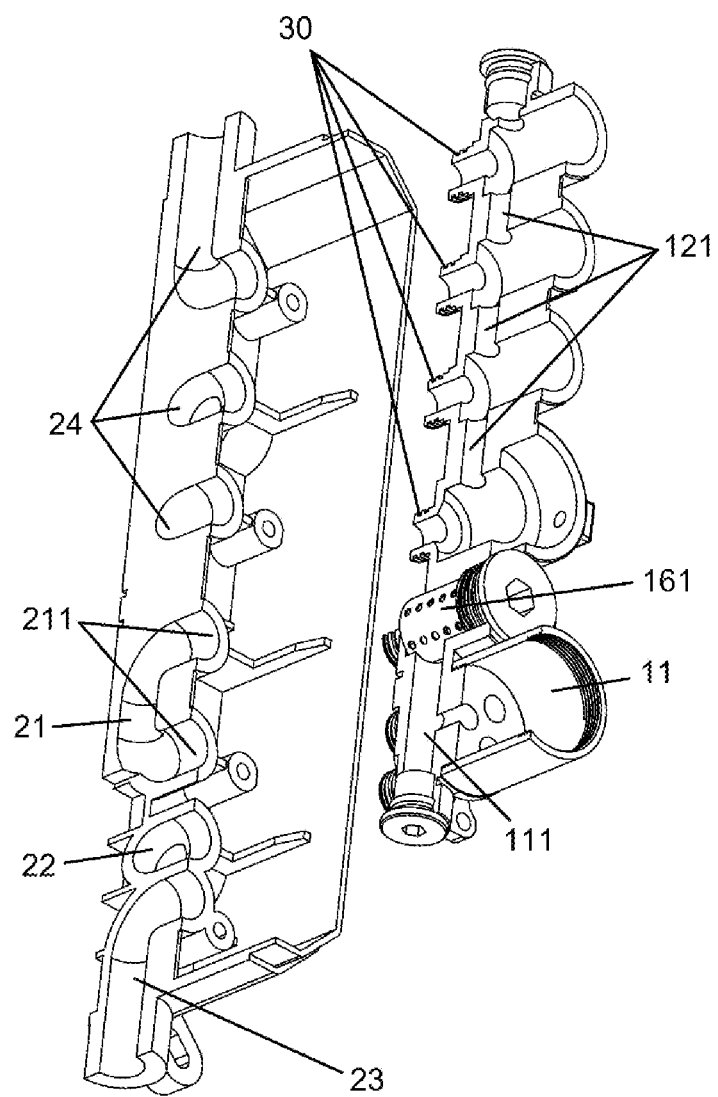
FIG. 6 is an explosive partial sectional view of the shower faucet of the present invention.

As shown in FIGS. 1 to 6, a valve element cover plate is provided, comprising the cover plate body 10. The cover plate body 10 is provided with the water mixing valve mounting position 11 and at least one switching valve mounting position 12. The cold water inlet 13 and the hot water inlet 14 connected to the water mixing valve mounting position 11, and the water outlets 15 corresponding to the switching valve mounting positions 12 are arranged on the back of the cover plate body 10. The cold water inlet 13, the hot water inlet 14 and the water outlets 15 protrude outwards away from the front side of the cover plate body 10. The cold water inlet 13, the hot water inlet 14 and the outer cylindrical wall of the water outlets 15 are provided with sealing rings (not shown in the figure); the water diverting channel 121 connected in series with each switching valve mounting position 12 is arranged in the cover plate body 10. The mixed water channel 111 connected to the water diverting channel 121 is arranged in the water mixing valve mounting position 11; the fixing parts 17 are arranged on the side of the cover plate body 10.

The above structure shows that the sealing is achieved by changing traditional end-face sealing structure into protruding structure, that is, allow the cold water inlet 13, the hot water inlet 14 and the water outlets 15 to protrude outwards, and then arrange sealing rings on their outer cylindrical walls. When finally connecting to the concealed water distribution box 20, insert them into the corresponding connectors of the concealed water distribution box 20 to improve the sealing effect. Even when the cover plate body 10 is deformed, a sufficient axial allowance from connecting and inserting can ensure the sealing effect, so it can still maintain a good sealing performance in a high-pressure water environment; the cold water inlet 13 and the hot water inlet 14 are used to supply cold water and hot water respectively. After being mixed by the water mixing valve element 112 in the water mixing valve mounting position 11, the water is discharged through the mixed water channel 111 to the downstream. When water enters the diverting channel 121, the switching valve elements 122 in each switching valve mounting position 12 control the on-off of water flow at their respective water outlets; the fixing parts 17 are arranged on the side of the cover plate body 10 for connecting the concealed water distribution box 20 during installation.

In this embodiment, the cover plate body 10 is provided with the filter mounting position 16, and the mixed water channel 111 is connected to the water diverting channel 121 through the filter mounting position 16.

The above structure shows that the mixed water is filtered by the filter 161 and debris such as scale will not enter the switching valve elements 122 to avoid wear and blockage at the downstream water outlets; since the filter mounting position 16 is arranged at the downstream of the water mixing valve element 112, the user only needs to close the water mixing valve element 112 when replacing or cleaning the filter 161 without turning off the indoor water main, which effectively improves the convenience of cleaning or replacing the filter 161.

In this embodiment, the mixed water outlet 18 connected to the filter mounting position 16 and the mixed water inlet 19 connected to the upstream of the water diverting channel 121 are arranged on the back of the cover plate body 10; the filter mounting position 16 is connected to the mixed water inlet 19 through the mixed water outlet 18 and the external pipeline 21 and then connected to the water diverting channel 121; the mixed water outlet 18 and the mixed water inlet 19 protrude outwards away from the front side of the cover plate body 10; the sealing rings (not shown in the figure) are arranged in the mixed water outlet 18 and on the outer cylindrical wall of the mixed water inlet 19.

The above structure shows that the mixed water channel 111 is connected to the inner cylindrical wall of the filter mounting position 16, and the mixed water outlet 18 is connected to the bottom of the filter mounting position 16. The filter 161 is a cylindrical filter screen (where the mixed water is filtered after flowing through the mixed water channel 111, from the outer cylindrical wall of the filter 161 towards the center of the filter 161, then discharged from the mixed water outlet 18) and the mixed water outlet 18 is connected to the mixed water inlet 19 through the external pipeline 21; the above structure is designed for easily demolding the cover plate body 10 when it is produced by injection molding, and arranging the filter 161; the mixed water outlet 18 and the mixed water inlet 19 also protrude outwards to ensure the sealing effect.

In this embodiment, the cover plate body 10 is provided with the hydroelectric generator mounting position 101, and the mixed water inlet 19 is connected to the water diverting channel 121 through the hydroelectric generator mounting position 101.

The above structure shows that the mixed water enters the hydroelectric generator mounting position 101 through the mixed water inlet 19 and then flows to the water diverting channel 121.

In this embodiment, the hydroelectric generator 102 is arranged in the hydroelectric generator mounting position 101.

The above structure shows that the water flows from the rear end face of the hydroelectric generator 102 to the side wall of its middle section during operation, so the mixed water inlet 19 is arranged at the bottom of the hydroelectric generator mounting position 101 to enable the water to effectively wash the impellers of the hydroelectric generator 102 and flow to the downstream through the water diverting channel 121 connected to the inner cylindrical wall of the hydroelectric generator mounting position 101.

In this embodiment, the display module 103 is arranged outside the hydroelectric generator 102 in the hydroelectric generator mounting position 101.

The above structure shows that the display module 103 is electrically connected to the hydroelectric generator 102 for displaying information such as water temperature and flow rate, and the hydroelectric generator 102 is provided with a temperature sensor.

In this embodiment, the water mixing valve mounting position 11, the switching valve mounting positions 12, the filter mounting position 16 and the hydroelectric generator mounting position 101 are arranged on the front side of the cover plate body 10.

The arrangement can effectively ensure the compactness of the overall structure; the water mixing valve mounting position 11, the switching valve mounting positions 12, the filter mounting position 16 and the hydroelectric generator mounting position 101 are preferably arranged on the front side of the cover plate body 10, and can also be arranged on the upper surface of the cover plate body 10.

In this embodiment, the water mixing valve element 112 is arranged in the water mixing valve mounting position 11; the switching valve elements 122 are arranged in the switching valve mounting positions 12; and the filter 161 is arranged in the filter mounting position 16.

The above structure shows that the water mixing valve element 112 is used to adjust the mixing ratio of cold water to hot water, and control the on/off of the overall water flow; the switching valve elements 122 are used to control the on/off of the water flow at their respective downstream outlets; the filter 161 and the filter mounting position 16 are detachable and preferably connected by threads.

In this embodiment, at least one outer groove 30 is arranged at the cold water inlet 13, the hot water inlet 14, the water outlets 15, the mixed water outlet 18 and the outer cylindrical wall of the mixed water inlet 19, and the sealing ring is arranged in the outer groove 30.

The above structure shows that two outer grooves 30 are preferably arranged for further improving the sealing effect.

Embodiment 2

As shown in FIGS. 1 to 6, a shower faucet made of the valve element cover plate further comprises the concealed water distribution box 20. The concealed water distribution box 20 is provided with the cold water connector 22, the hot water connector 23, and the outlet connectors 24 arranged in the same number as that of the water outlets 15. One end of the cold water connector 22, the hot water connector 23 and the outlet connectors 24 arranged in the same number as that of the water outlets 15 are respectively arranged at the outer wall of the concealed water distribution box 20, and the other end thereof is respectively arranged at the bottom of the inner cavity of the concealed water distribution box 20; the connecting parts 25 corresponding to the fixing parts 17 are arranged at the bottom of the inner cavity of the concealed water distribution box 20. A plurality of the fixing parts 17 and a plurality of the connecting parts 25 are arranged correspondingly to each other in the same number. The fixing parts 17 are connected by screws (not shown in the figure) to the connecting parts 25. Therefore, the cold water inlet 13, the hot water inlet 14 and each water outlet 15 on the back of the cover plate body 10 are respectively connected to the cold water connector 22, the hot water connector 23 and each outlet connector 24 to achieve sealing.

The above structure shows that the concealed water distribution box 20 is buried in the wall, its cold water connector 22 is connected to the water main, its hot water connector 23 is connected to the water heater, and its outlet connectors 24 are connected to each water outlet; the cover plate body 10 is fixed in the concealed water distribution box 20 by screws (not shown in the figure), and each connector is connected and inserted for good sealing. Compared with simple end-face squeezing seal, it has higher sealing performance and stronger pressure-bearing capacity, thus forms a concealed shower faucet with filtering function.

Further, the present invention proposes that the external pipeline 21 is arranged at the bottom of the inner cavity of the concealed water distribution box 20 and provided with two mixed water connectors 211 connected to each other. The mixed water outlet 18 and the mixed water inlet 19 are inserted into the mixed water connectors 211 to achieve sealing.

The above structure shows that the external pipeline 21 is used to connect the mixed water outlet 18 with the mixed water inlet 19.

The present invention has the following beneficial effects: traditional end-face sealing structure is changed into the protruding structure, that is, allow the cold water inlet 13, the hot water inlet 14 and the water outlets 15 to protrude outwards, and then arrange sealing rings on their outer cylindrical walls. When finally connecting to the concealed water distribution box 20, insert them into the corresponding connectors of the concealed water distribution box 20 to improve the sealing effect. Even when the cover plate body 10 is deformed, a sufficient axial allowance from connecting and inserting can ensure the sealing effect, so it can still maintain a good sealing performance in a high-pressure water environment; the cold water inlet 13 and the hot water inlet 14 are used to supply cold water and hot water respectively. After being mixed by the water mixing valve element 112 in the water mixing valve mounting position 11, the water is discharged through the mixed water channel 111 to the downstream. When the water enters the diverting channel 121, the switching valve elements 122 in each switching valve mounting position 12 control the on-off of their own water outlets; the fixing parts 17 are arranged on the side of the cover plate body 10 for connecting the concealed water distribution box 20 during installation.

The foregoing is only the preferred embodiments of the present invention. It will be appreciated by those of ordinary skills in the art that some improvements and modifications may be made thereto without departing from the technical principles of the present invention, and such improvements and modifications of the above assumptions should fall within the protection scope of the present invention.

What is claimed is:

1. A valve element cover plate, comprising: a cover plate body comprising: a water mixing valve mounting position; and at least one switching valve mounting position; a cold water inlet and a hot water inlet connected to the water mixing valve mounting position; water outlets corresponding to the at least one switching valve mounting position, the water outlets coupled to a back of the cover plate body, wherein the cold water inlet, the hot water inlet, and the water outlets protrude outwards from a front side of the cover plate body, and wherein the cold water inlet, the hot water inlet, and an outer cylindrical wall of the water outlets are provided with sealing rings; a water diverting channel connected in series with each switching valve mounting position of the at least one switching valve mounting position and is arranged in the cover plate body, a mixed water channel connected to the water diverting channel and arranged in the water mixing valve mounting position; and fixing parts arranged on a side of the cover plate body; wherein the cover plate body is provided with a filter mounting position, and the mixed water channel is connected to the water diverting channel through the filter mounting position; and wherein a mixed water outlet connected to the filter mounting position and a mixed water inlet connected to an upstream of the water diverting channel coupled to the back of the cover plate body, the filter mounting position is connected to the mixed water inlet through the mixed water outlet and an external pipeline and then connected to the water diverting channel, the mixed water outlet and the mixed water inlet protrude outwards away from the front side of the cover plate body, and the sealing rings are also arranged at the mixed water outlet and on an outer cylindrical wall of the mixed water inlet.

2. The valve element cover plate according to claim 1, wherein the cover plate body is provided with a hydroelectric generator mounting position, and the mixed water inlet is connected to the water diverting channel through the hydroelectric generator mounting position.

3. The valve element cover plate according to claim 2, wherein a hydroelectric generator is arranged in the hydroelectric generator mounting position.

4. The valve element cover plate according to claim 3, wherein a display module is arranged outside the hydroelectric generator in the hydroelectric generator mounting position.

5. The valve element cover plate according to claim 2, wherein the water mixing valve mounting position, the switching valve mounting positions, the filter mounting position, and the hydroelectric generator mounting position are coupled to the front side of the cover plate body.

6. The valve element cover plate according to claim 1, wherein a water mixing valve element is arranged in the water mixing valve mounting position, switching valve elements are arranged in the switching valve mounting positions, and a filter is arranged in the filter mounting position.

7. The valve element cover plate according to claim 1, wherein at least one outer groove is arranged at the cold water inlet, the hot water inlet, the water outlets, the mixed water outlet, and the outer cylindrical wall of the mixed water inlet, and a sealing ring of the sealing rings is arranged in the outer groove.

8. The valve element cover plate according to claim 1, further comprising:
   a concealed water distribution box, wherein the concealed water distribution box comprises a cold water connector, a hot water connector, and outlet connectors coupled to an outer wall of the concealed water distribution box and a bottom of an inner cavity of the concealed water distribution box;
   connecting parts corresponding to the fixing parts are arranged at the bottom of the inner cavity of the concealed water distribution box, wherein the fixing parts are connected by screws to the connecting parts.

* * * * *